Patented Jan. 5, 1937

2,066,933

UNITED STATES PATENT OFFICE 2,066,933

PROCESS FOR TREATING SLUDGES

Earle W. Gard, Palos Verdes Estates, Calif., assignor to Union Oil Company of California, Los Angeles, Calif., a corporation of California No Drawing. Application October 20, 1930, Serial No. 490,108

20 Claims. (Cl. 196—148)

This invention relates to a process of treating acid sludges produced by the reaction of sulfuric acid with hydrocarbon oils.

In the treatment of hydrocarbon oils such as mineral oils, shale oils, and the like with sulfuric acid, an acid sludge is formed by the reaction of the acid upon certain constituents of the oil. This acid sludge is then separated from the acid treated oil, usually by settling and decantation. A recovery of the acid and the sludge oil from the acid sludge is then effected by hydrolysis of the acid sludge. The recovered acid may then be brought up to the desired concentration for reuse in the system. The sludge oil recovered from the acid sludge may be used for fuel oil, solvent oil, or for other purposes. In the usual mode of operation of both continuous and batch acid treating processes, this acid sludge is stored in storage tanks or the like until a sufficient quantity is accumulated before it is further treated for the recovery of acid therefrom and the production of sludge oil.

I have found that when acid sludge which has been allowed to accumulate in the ordinary manner is subjected to hydrolysis for the recovery of acid and sludge oil, the acid thereby obtained has a relatively weak acid concentration and contains a relatively large amount of deleterious carbonaceous material. The sludge oil thus recovered has a high specific gravity, and is viscous and difficult to handle, particularly when it is to be used as a fuel oil.

According to my invention, I overcome these difficulties by controlling the temperature of the acid sludge during its accumulation from the time that it is separated from the acid treated oil until the subsequent hydrolyzing treatment. By this process, the acid thereby obtained is of relatively high acid concentration and contains a relatively small amount of deleterious carbonaceous material. The sludge oil thus recovered has a lower specific gravity, is less viscous, and is more suitable for use as fuel oil.

Likewise, I have found that it is particularly advantageous to control the temperature of the acid sludge while the said acid sludge is settling out from the acid treated oil. Best results are obtained by controlling the temperature of the acid sludge while the latter settles out from the acid treated oil and also while the acid sludge accumulates until it is subjected to the subsequent hydrolyzing treatment.

An object of my invention is to recover from acid sludge an acid having a relatively high degree of acidity and a relatively small amount of deleterious carbonaceous material.

Another object of this invention is to recover a sludge oil from acid sludge, said sludge oil having a relatively low specific gravity and a viscosity which renders it particularly suitable for use as fuel oil.

A further object of the present invention is to provide a process for acid treating oil and removing the acid from the acid reaction products by commingling acid and oil to form acid sludge, separating the acid sludge from the oil, hydrolyzing the acid sludge, and controlling the temperature of the sludge prior to the hydrolyzing treatment to control the acidity of the resulting acid and the gravity of the resulting oil.

An additional object is to control the temperature of the sludge for the above mentioned purpose during the separation of the sludge from the oil prior to the hydrolyzing treatment.

Another object is to control the temperature of the sludge during the separation of the sludge from the oil and during the period of accumulation of the sludge prior to the hydrolyzing treatment.

My process may be applied to the sludge obtained by the action of sulfuric acid on hydrocarbon oils such as mineral oil, including such fractions as gasoline, kerosene, lubricating oils or the like. For purposes of illustration, my invention will now be described in its application to a sludge produced by the treatment of sulfuric acid on gasoline.

A gasoline produced from a liquid phase cracking operation and having a gravity of about 52° Bé. is treated by intermixture with sulfuric acid either continuously or in the batch process, both processes being well known to those skilled in the art. If no cooling is employed during acid treatment of the oil, the heat of reaction will raise the temperature thereof from a normal temperature of about 80° F. to a temperature of about 140° F. In order to avoid excessive polymerization and sulfonation of the oil being treated, the oil may be cooled during acid treatment.

In the usual mode of procedure, the acid sludge is withdrawn and is allowed to accumulate before it is operated upon for the recovery of acid and sludge oil. During this period of accumulation of the acid sludge certain reactions occur which cause a substantial lowering of the acid value of the recovered acid and a substantial increase in the viscosity of the recovered sludge oil which is heavy and resembles tar.

It has been found that even though the acid sludge may have been cooled by the cooling of the oil being acid treated, if the acid sludge is allowed to stand during accumulation without temperature control, the deleterious results are still found to occur upon the recovery of the acid and sludge oil therefrom.

The reactions which occur are somewhat obscure and are not clearly understood, but, without intending to be limited by the theory, I believe the facts may be explained by the following theory of sulfonation and polymerization. It is believed that these results are due to certain exothermic reactions which take place within the acid sludge itself. The heat of reaction accelerates the rapidity of the reaction, thereby further increasing the temperature of the acid sludge, and results in certain reactions, probably including polymerization and sulfonation of at least some of the components of the acid sludge.

The effect of these reactions is even more severe if the oil being acid treated is not cooled during said acid treatment because the acid sludge formed thereby has been heated by the heat produced by the reactions between the oil and acid. However, this, of itself, is not sufficient, for even if the reaction mixture is cooled during the reaction, the temperature continues to rise during the settling and during the storage period.

It is to be understood that when I use the term "polymerization and sulfonation reactions", I mean to include all the reactions, whatever they may be, which occur internally within the acid sludge and which cause the production of a weak acid upon hydrolysis and the recovery of a viscous sludge oil from the acid sludge.

By my invention, the acid sludge is cooled during the settling period while it separates from the acid treated oil and this lower temperature is maintained or further reduced during accumulation and storage before recovery of the acid and sludge oil therefrom. Any reduction in the temperature of the acid sludge results in retarding the polymerization and sulfonation reactions. In fact, the temperature may be so far reduced as to substantially inhibit these reactions. The temperature at which the acid sludge may be maintained after separation from the oil may be as low as 50° F. although it is not necessary to decrease its temperature to this point in order to at least partially retard the reactions. A temperature of 70° F. may be maintained with good results.

The acid sludge which has thus been maintained at a reduced temperature may then by hydrolyzed with water to remove the acid therefrom; or other methods may be employed to separate the acid from the sludge oil. The particular method of hydrolysis is not important, the invention in this case being independent of the particular mode of separation of acid and oil. The method includes the conventional step of hydrolysis with water at elevated temperatures under pressure or at atmospheric pressure and may employ neutralization agents such as sodium hydroxide. Such methods are described in "American Petroleum Refining", a book by H. S. Bell, second edition 1930, page 530. These methods are now conventional and are widely used and their description will needlessly extend this specification.

It will be found that this acid will have a higher acid value than the acid derived from acid sludge which was not maintained at a reduced temperature. In addition, the carbonaceous material dissolved in the recovered acid will be substantially less than that in the acid from uncooled acid sludge. In contradistinction with the viscous, heavy, tarry sludge oil previously obtained, the sludge oil recovered from acid sludge maintained at temperatures at which polymerization and sulfonation reactions are retarded and/or substantially inhibited is not heavy and tarry but is a fluid which in the illustration may vary in gravity from 10° Bé. to 20° Bé.

By this method I am able to obtain an acid of higher acidity and containing less carbonaceous matter, thereby producing a cleaner and better material for concentrating to the desired strength, which may be 66° Bé. acid. I am also able to produce a more valuable sludge oil having a higher gravity and a lower viscosity than under the present methods. The concentrated acid may be reused for the treatment of additional oil. The sludge oil thus recovered is a superior fuel oil. Other uses may also be found for the sludge oil, such as its utilization as a solvent oil.

It is to be understood that the above is merely illustrative of a preferred operation of the invention, of which many variations may be made by those skilled in the art without departing from the spirit thereof.

I claim:

1. A process of acid treating oil and removing the acid from the acid reaction products which comprises commingling acid and oil to form acid sludge, separating the acid sludge from the oil, cooling the acid sludge during separation, subsequently hydrolyzing the acid sludge and maintaining the sludge at a low temperature from the time of its formation to the hydrolyzing treatment to produce an oil on hydrolysis having a viscosity less than the viscosity of the oil which would be produced without said cooling.

2. A process of acid treating oil and removing the acid from the acid reaction products which comprises commingling acid and oil to form acid sludge, separating the acid sludge from the oil, subsequently hydrolyzing the acid sludge, and cooling the sludge during said separation from the oil and at all times prior to the hydrolyzing treatment to produce an oil on hydrolysis having a viscosity less than the viscosity of the oil which would be produced without said cooling.

3. A process of acid treating oil and removing the acid from the acid reaction products which comprises commingling acid and oil to form acid sludge, separating the acid sludge from the oil, accumulating the acid sludge by storage thereof, hydrolyzing the accumulated acid sludge, and cooling said acid sludge during said storage to produce an oil on hydrolysis having a viscosity less than the viscosity of the oil which would be produced without said cooling.

4. A process of acid treating oil and removing the acid from the acid reaction products which comprises commingling acid and oil to form acid sludge, separating the acid sludge from the oil, accumulating the acid sludge by storage thereof, hydrolyzing the accumulated acid sludge, and cooling said acid sludge during said separation and said storage to produce an oil on hydrolysis having a viscosity less than the viscosity of the oil which would be produced without said cooling.

5. A process of acid treating oil and removing the acid from the acid reaction products which comprises commingling acid and oil to form acid sludge, separating the acid sludge from the oil, cooling the sludge during said separation, subsequently hydrolyzing the acid sludge and maintaining said sludge at a low temperature from the time of its formation to the hydrolyzing treatment to substantially inhibit polymerization and sulfonation therein.

6. A process of acid treating oil and removing the acid from the acid reaction products which comprises commingling acid and oil to form acid sludge, separating the acid sludge from the oil, subsequently hydrolyzing the acid sludge, and cooling said sludge during said separation from the oil and at all times prior to the hydrolyzing treatment to substantially inhibit polymerization and sulfonation therein.

7. A process of acid treating oil and removing the acid from the acid reaction products which comprises commingling acid and oil to form acid sludge, separating the acid sludge from the oil, accumulating the acid sludge by storage thereof, hydrolyzing the accumulated acid sludge, and cooling said acid sludge during said storage to substantially inhibit polymerization and sulfonation therein.

8. A process of acid treating oil and removing the acid from the acid reaction products which comprises commingling acid and oil to form acid sludge, separating the acid sludge from the oil, accumulating the acid sludge by storage thereof, hydrolyzing the accumulated acid sludge, and cooling said acid sludge during said separation and said storage to substantially inhibit polymerization and sulfonation therein.

9. In a method of treating acid sludge derived from treating oil with acid and separating of the sludge, the steps comprising storing and accumulating said acid sludge and cooling the same during said storage and accumulation to substantially inhibit polymerization and sulphonation therein.

10. In a method of treating acid sludge derived from treating oil with acid and separating of the sludge, the steps comprising storing and accumulating said acid sludge and cooling the sludge during storage to maintain the same at a relatively low temperature during said storage and accumulation to substantially inhibit polymerization and sulphonation therein.

11. In a method for the recovery of sludge oil and acid from acid sludge derived from treating oil with acid and separating of the acid sludge, the steps comprising storage and accumulating said acid sludge, cooling the same during said storage and accumulation to substantially inhibit polymerization and sulphonation therein and subsequently hydrolyzing the acid sludge.

12. In a method for the recovery of sludge oil and acid from acid sludge derived from treating oil with acid and separating the acid sludge, the steps comprising storing and accumulating said acid sludge, cooling the sludge during storage to maintain the same at a relatively low temperature during said storage and accumulation to substantially inhibit polymerization and sulphonation therein and subsequently hydrolyzing the acid sludge.

13. A process of acid treating oil and removing the acid from the acid reaction products which comprises commingling acid and oil to form acid sludge, separating the acid sludge from the oil, subsequently hydrolyzing the acid sludge and maintaining the sludge at a temperature below 70° F. from the time of its formation to the hydrolyzing treatment to produce an oil on hydrolysis having a viscosity less than the viscosity of the oil which would be produced without said temperature control.

14. A process of acid treating oil and removing the acid from the acid reaction products which comprises commingling acid and oil to form acid sludge, accumulating the acid sludge by storage thereof, hydrolyzing the accumulated acid sludge and maintaining the acid sludge at a temperature below 70° F. during said storage, to produce an oil on hydrolysis having viscosity less than the viscosity of the oil which would be produced without said temperature control.

15. The method of treating acid sludges which are subjected to periods of storage and which tend during such periods to heat up by exothermic reaction and to so alter their state as to become excessively viscous upon hydrolysis to liberate the acid component thereof, which comprises cooling the acid sludge during storage to a temperature sufficiently low to substantially retard the alteration in the state thereof, and hydrolyzing the sludge at the end of the period of storage while it is still in a relatively non-viscous state.

16. A method for treating acid sludges which are subjected to periods of storage and during such storage tend to alter their condition so that they become excessively viscous upon hydrolysis, which method comprises cooling the acid sludge during storage to a temperature below about 70° F. thereby retarding said alteration in the condition thereof, and hydrolyzing such cooled acid sludge following storage.

17. A process for treating oils which comprises commingling a mineral oil with sulfuric acid to form an acid sludge, separating the acid sludge from the acid treated oil, subsequently hydrolyzing the acid sludge, and maintaining the temperature of said sludge during separation and at all times prior to hydrolysis at a temperature sufficiently low to prevent substantial polymerization and sulfonation of the oil constituent of the sludge.

18. A method according to claim 17 wherein the temperature of the sludge prior to hydrolysis is maintained below about 80° F.

19. A method for treating oils comprising commingling a mineral oil with sulfuric acid to produce an acid sludge, establishing a low temperature in the mixture, separating the resultant acid sludge from the acid treated oil at a low temperature, maintaining the separated sludge at a low temperature until subjected to a subsequent treatment, such low temperature being low enough to prevent substantialy polymerization and sulfonation of the oil constituent of the sludge, and subsequently subjecting the sludge to said treatment to produce an oil constituent and an acid constituent therefrom.

20. A process for acid treating oil and removing the acid from the acid reaction products which comprises commingling sulfuric acid and mineral oil to form acid sludge, separating the acid sludge from the oil, subsequently treating the acid sludge to separate it into acid and oil constituents, and maintaining the sludge during separation of the sludge from the acid treated oil and prior to the treatment of the sludge at temperatures low enough to prevent substantial polymerization and sulfonation of the oil constituent in the sludge.

EARLE W. GARD.